Figure 1:
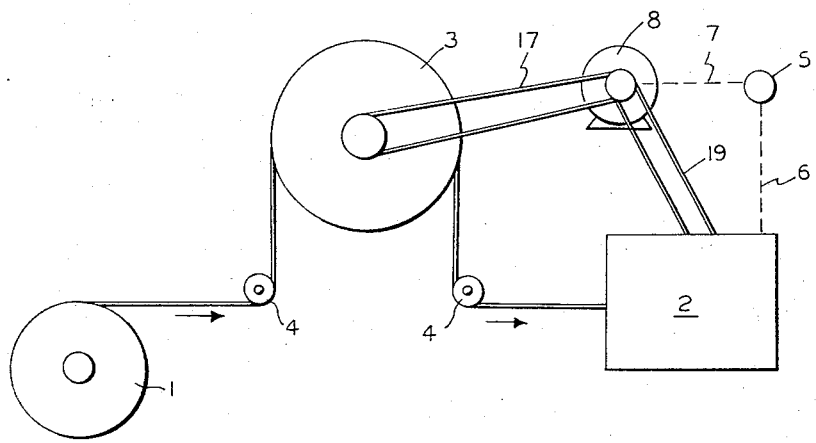

Feb. 27, 1968   P. J. O'TOOLE   3,370,768
REGISTRATION AND TENSION CONTROL APPARATUS
Filed Feb. 14, 1966

INVENTOR
PHILIP J. O'TOOLE

BY

ATTORNEYS

United States Patent Office 3,370,768
Patented Feb. 27, 1968

3,370,768
REGISTRATION AND TENSION CONTROL APPARATUS
Philip J. O'Toole, Bay City, Mich., assignor to The Dow Chemical Company, Midland, Mich., a corporation of Delaware
Filed Feb. 14, 1966, Ser. No. 527,326
4 Claims. (Cl. 226—30)

This invention relates to an improved apparatus for continuously feeding film to a manufacturing operation using that film, and, more particularly, it relates to an improved apparatus for feeding film to a manufacturing operation at a substantially constant speed and under a substantially constant tension.

Synthetic thermoplastic films such as polyolefins, vinyl films, polyesters, cellophane, and the like, are widely used in the manufacture of containers for almost any type product. In many instances, particularly where the film is of small gauge, the film is merely wrapped around the product and sealed shut so that the wrapped product may be handled without damaging the product. The preparation of containers or the wrapping of products is desirably accomplished on a continuous basis, and this requires automated operations which can supply film at speeds and under the conditions required by the packaging operation. When film having labels printed on the surface is used in such operations, it is necessary to monitor a pattern or spot on the film to obtain proper indexing of the labels with the individual packages. A photoelectric scanner is generally used to monitor the printed film and deliver a signal to a variable speed drive to advance or retard the film appropriately to maintain the proper registration of the label. Such changes in film speed and particularly when the speed is accelerated may increase the tension in the film passing through the machine owing to the inertia of the film supply and forming apparatus. Since thermoplastic films are highly desired for wrapping and for containers because of their attractive appearance, it is important that the operation of making the containers does not apply sufficient stress to the film to change its smooth, unmarred, and sometimes glossy surface. If, for example, the film is stretched beyond its normal elastic recovery point, it will acquire permanent wrinkles or surface deformities which are commercially unacceptable. If the film while under tension slips along a metal surface which is gripping the film, the surface will show slippage marks. The device of this invention is intended to prevent these surface mars from occurring.

It is an object of this invention to provide an apparatus having an improved film feeding means. It is another object of this invention to provide an improvement in an apparatus for making containers from thin, thermoplastic film, the improvement relating to the means of providing a substantially constant tension on the film as it enters the container forming device, even though film speed varies. Still other objects will appear from the more detailed description of this invention which follows.

The foregoing objects are, in general, accomplished in accordance with this invention by providing an improvement in an apparatus which pulls a continuous length of thermoplastic film having spaced surface markings under a substantially constant tension from a supply source, and feeds that film to a station for a manufacturing operation such as making a series of packages. The improvement comprises a roller having a surface which provides non-slipping, frictional engagement when in contact with the film, the roller being located between the supply source of the film and means for pulling the film into the station, a means for driving the roller and said means for pulling, an over-running clutch between the roller and the means for driving, a sensing device for determining the location of surface markings on said film with respect to indexing points in said station, and a speed regulator for receiving from the sensing device indications of deviations from standard in the location of surface markings with respect to said indexing points and regulating the speed of the film at the roller and at the means for pulling the roller so as to reduce said deviations substantially to zero. In brief, the roller delivers film to the package forming apparatus at a rate or speed which is synchronized with the film drive employed to pull the film through the forming apparatus. The over-running clutch on the roller compensates minor fluctuations in film travel and maintains substantially constant tension on the film being drawn through the forming apparatus.

Figure 2:
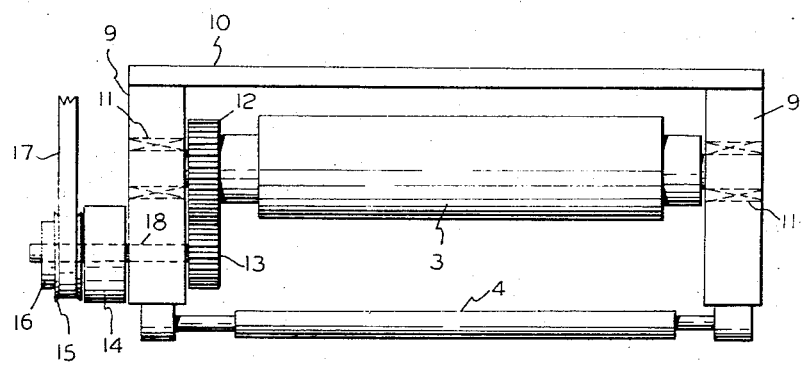

The attached drawings illustrate the general features of this invention. FIGURE 1 is a schematic illustration of the positioning of the improved feeding apparatus of this invention between a supply source and a subsequent manufacturing operation using that film. FIGURE 2 is an elevational view of the details of the improved feeding device of this invention.

In FIGURE 1, a supply source of thermoplastic film 1 is being fed into manufacturing station 2 which, for example, may be continuously preparing sausage-shaped packages from that film and continuously filling those packages with a product. It is to be understood that it is merely an illustrative application for station 2 to be fabricating containers for film. This station may represent any imaginable operation which pulls a continuous supply of thermoplastic film from a source 1, (which may be a roll of film, a continuous length of film supplied directly from the extruder producing that film, or any other convenient source of continuous lengths of thermoplastic film).

In the unimproved apparatus of the prior art, the film supply was fed directly from source 1 to station 2 without intervening assistance other than to guide and smooth the film and attempt to maintain it under a certain amount of tension by supplying the driving force for the film at station 2. This driving force required some means of gripping the film which, in turn, frequently caused a marring of the film surface thus making it unattractive and unsalable. Furthermore, the inertia of a large roll of film at source 1, in combination with the various frictional resistances between source 1 and station 2, produced a tension in the film, which frequently became so great that the film stretched beyond its normal recovery limit and produced permanent wrinkles in the film. Another disadvantage of the prior art was that when the operations at station 2 required a slight adjustment or change in speed of delivery of film from source 1 to station 2, it was almost impossible to make those changes instantaneously while maintaining a substantially constant tension on the film.

This invention provides an automated feed improvement interposed between the source 1 and the station 2. This feeding improvement has as its principal component a feed roller 3 which, optionally, may be assisted by guide rolls 4. Guide rolls 4 serve the sole purpose of providing a large wraparound for the film on roller 3. Roller 3 and a means (e.g., a driven roller) within station 2 for positively driving film into the packaging operations therein are both driven by a means such as motor 8 through belts, chains or the like 17 and 19. The circumferential speed of roller 3 is controlled so as to synchronize it with the speed of the film entering station 2. This control is accomplished by a sensing device, shown schematically at 5, having at least two control connections. Through connection 6 sensing device 5 is able to detect whether the labels or printing on the film is at the proper location in the machinery of station 2 that the resulting package will have the label or printing correctly positioned. Through connection 7 sensing device 5 increases or decreases the speed of motor 8 which simultaneously drives roller 3 and the means within station 2 which is pulling film into that station to place its label or printing into registry as detected by connection 6. Connection 7 provides a means for sensing device 5 to increase or decrease the speed of roller 3 so as to synchronize it with the speed of the film entering station 2.

In FIGURE 2, the more detailed construction of the improvement of this invention may be seen. Roller 3 and guide rolls 4 are shown mounted on a housing comprising end brackets 9 and tie bar 10. The shaft of roller 3 is supported in end brackets 9 by suitable bearings 11, not shown here. Roller 3 is driven by any suitable means such as spur gears 12 and 13, which are in turn, driven by a motor. This portion of the device is not limited to any particular means, and skilled engineers may suggest alternatives such as belt driven or chain driven means for turning roller 3 in a positive fashion. Spur gear 13 is mounted on shaft 18 which is driven through pulley 15 by timing belt or chain 17 at a speed which is synchronized with that of the device at station 2 which pulls the film through the package forming and filling apparatus. Between pulley 15 and spur gear 13 is mounted an over-running clutch 14. Collar 16 serves to maintain pulley 15 in its proper position on shaft 18. Over-running clutch 14 is a key component of this device in that it provides roller 3 with the capability of slippage. When sensing device 5 commands motor 8 to change its speed there is a short period of time during which the film is accommodating itself to the new speed and during this time the tension on the film may tend to increase or decrease. Over-running clutch 14 compensates the variations in film speed to provide substantially constant tension between roller 3 and station 2 at all times and regardless of whether the film speed is being increased or decreased.

The composition of the surface of roller 3 is an important feature of this invention since it must provide a good gripping action to the film contacting that surface. The various thermoplastic films which may be employed have different surface frictional properties, and, therefore, it is obvious that there will be preferred materials for roller 3 when used with any specific thermoplastic film. The best material which has been found for overall usage in this regard is rubber, particularly neoprene, although natural rubber and other synthetic rubbers are useful in many embodiments of this invention.

This device is well-suited to function as an improvement on the packaging machine described and claimed in U.S. Patent 2,831,302 which issued April 22, 1958 to Jensen et al. and assigned to Oscar Mayer & Co. The improved device of this invention is mounted between the film source of the Jensen et al. patent (reference numeral 21 in FIGURE 1) and the forming plate (reference numeral 30 in FIGURE 1) which is the beginning of the operation of forming the sausage-like chub packages shown in FIGURE 22 of the patent.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. In an apparatus where a continuous length of thermoplastic film having spaced surface markings is pulled at a substantially constant speed and under a substantially constant tension from a supply source and into a station for further operations, the improvement which comprises a roller having a surface which provides nonslipping frictional engagement with said film, said roller being located between the supply source of the film and the pulling means feeding film into the station for further operations, a means for driving said roller and said pulling means, an over-running clutch between said roller and said means for driving, a sensing device for determining the location of surface markings on said film with respect to indexing points in said station, and a speed regulator for receiving from said sensing device indications of deviations from standard in the location of surface markings with respect to said indexing points and regulating the speed of the film at said roller and at said pulling means so as to reduce said deviations substantially to zero.

2. The apparatus of claim 1, wherein the surface of said roller is rubber.

3. The apparatus of claim 1, which includes on each side of the driven roller a guide roller positioned so as to produce a substantial wraparound of said film on said driven roller.

4. The apparatus of claim 1 in combination with a machine for fabricating chub packages.

References Cited

UNITED STATES PATENTS 2,200,328   5/1940   Cohn _____ 226—37
2,658,751   11/1953  Jaeschke _____ 226—29

M. HENSON WOOD, Jr., *Primary Examiner.*

R. A. SCHACHER, *Assistant Examiner.*